United States Patent [19]
Lester, Jr. et al.

[11] Patent Number: 5,654,966
[45] Date of Patent: Aug. 5, 1997

[54] CIRCUIT AND METHOD FOR MULTIPLEXING A FRAME-RELAY VIRTUAL CIRCUIT AND FRAME-RELAY SYSTEM HAVING MULTIPLEXED VIRTUAL CIRCUITS

[75] Inventors: Lee H. Lester, Jr., St. Petersburg; Richard Allen Mundwiler, Safety Harbor, both of Fla.

[73] Assignee: Paradyne Corporation, Largo, Fla.

[21] Appl. No.: 557,873

[22] Filed: Nov. 14, 1995

[51] Int. Cl.$^6$ ........................................ H04Q 3/04
[52] U.S. Cl. .................. 370/392; 370/410; 370/522
[58] Field of Search .......................... 370/297, 389, 370/392, 397, 409, 410, 420, 474, 522, 524

[56] References Cited

U.S. PATENT DOCUMENTS

| | | | |
|---|---|---|---|
| 5,237,564 | 8/1993 | Lespagnol et al. | 370/60.1 |
| 5,245,614 | 9/1993 | Gutman et al. | 370/118 |
| 5,291,484 | 3/1994 | Tomita et al. | 370/68.1 |
| 5,315,588 | 5/1994 | Kajiwara et al. | 370/60.1 |
| 5,315,591 | 5/1994 | Brent et al. | 370/85.6 |
| 5,353,336 | 10/1994 | Hou et al. | 379/67 |
| 5,371,731 | 12/1994 | Pratt et al. | 370/13 |
| 5,452,306 | 9/1995 | Turudic et al. | 370/524 |
| 5,481,544 | 1/1996 | Baldwin et al. | 370/392 |
| 5,490,141 | 2/1996 | Lai et al. | 370/397 |
| 5,550,827 | 8/1996 | Fernström | 370/392 |

*Primary Examiner*—Benedict V. Safourek
*Attorney, Agent, or Firm*—Thomas, Kayden, Horstemeyer & Risley

[57] ABSTRACT

For use with a frame-relay network capable of relaying frames having associated flags, a multiplexing circuit and method for providing end-to-end data management over a single frame-relay virtual circuit of the network. The circuit includes: (1) a logical channel creation circuit for designating a channel flag and first and second headers to be associated with frames relayed via first and second logical channels over the single frame-relay virtual circuit, respectively and (2) a multiplexer for associating frames of first and second data streams with the first and second logical channels, respectively, by inserting the channel flag and second header into each frame of the second data stream and the first header into only frames of the first data stream for which the associated flags match the channel flag, the first and second logical channels thereby allowed to be multiplexed over the single frame-relay virtual circuit, ones of the frames of the first data stream free of the first header to reduce an overhead of the multiplexing circuit.

24 Claims, 5 Drawing Sheets

FIG. 5

| F | ADDRESS FIELD | CONTROL | PAD | NLPID | USER DATA (INFORMATION) | FCS | F |

CIRCUIT AND METHOD FOR MULTIPLEXING A FRAME-RELAY VIRTUAL CIRCUIT AND FRAME-RELAY SYSTEM HAVING MULTIPLEXED VIRTUAL CIRCUITS

TECHNICAL FIELD OF THE INVENTION

The present invention is directed, in general, to frame-relay networks and, more specifically, to a system and method for multiplexing frames from different sources onto a single frame-relay virtual circuit.

BACKGROUND OF THE INVENTION

Modern communications networks generally include a multiplicity of paths or links that are interconnected to route voice, video and data (hereinafter collectively referred to as "data") traffic from one location of the network to another. At each location, an interconnect node or office couples a plurality of sources and destinations to the network. In some cases, the sources and destinations are incorporated in a private line network that includes a series of offices connected together by leased-lines with switching facilities and transmission equipment owned and operated by the carrier and leased to the user. This type of network is conventionally referred to as a circuit-switching network. Accordingly, a source of one office at one location of the network may transmit data to a destination of a second office located at another location of the network through their respective switching facilities.

Generally, at any given location, since a large number of sources desire to communicate through their respective switching facilities to destinations at various other locations of the network, the data traffic from the various sources is first multiplexed through the source switching facility, then demultiplexed at the destination switching facility and finally delivered to the proper destination. A variety of techniques for efficiently multiplexing the data from multiple sources onto a single circuit of the network are presently employed in private line networks. For instance, time division multiplexing ("TDM") affords each source full access to the allotted bandwidth of the circuit for a small amount of time. The circuit is thus divided into time segments corresponding to specific sources to provide for the transfer of data from those sources, when called upon, through the network. Multiplexing techniques, such as TDM, significantly increase the throughput of data throughout the private line network.

Other data communications systems, in contrast, have not been as successful employing multiplexing techniques to enhance network efficiency further. In particular, frame-relay networks offer far fewer alternatives than their circuit-switching network counterparts. Frame-relay networks are often referred to as packet-switching networks. Packet-switching networks, as opposed to circuit-switching networks, allow multiple users to share the data network facilities and bandwidth rather than providing a specific amount of dedicated bandwidth to each user, as in TDM. Packet switches divide bandwidth into connectionless, virtual circuits. Virtual circuit bandwidth is only consumed when data are actually transmitted; otherwise, the bandwidth is not used. While packet-switching networks may appear to mirror the operation of a statistical multiplexer (whereby multiple logical users share a single network access circuit), there is still room for improving network throughput efficiency in frame-relay and other packet-switching networks.

For instance, a one-to-one correspondence exists between applications and frame-relay virtual circuits, there being no inherent mechanism in today's frame-relay standards for transport of end-to-end data management. Internet Engineering Task Force Request for Comments ("IETF RFC") 1490 "Multiprotocol Interconnect Over Frame Relay," as herein incorporated by reference, provides the ability to multiplex protocols, but forces the equation of a protocol to a single logical channel on a given virtual circuit. Additionally, IETF RFC 1490 protocol headers must appear on every single frame transmitted over the circuit, without exception.

Accordingly, what is needed in the art is a circuit, method and system for multiplexing frames from different sources onto a single frame-relay virtual circuit. The system and method must be proficient at various levels of capabilities or modes, and no additional restrictions shall be placed on the format of the data carried by the virtual circuit.

SUMMARY OF THE INVENTION

To address the above-discussed deficiencies of the prior art, the present invention provides, for use with a frame-relay network capable of relaying frames having associated flags, a multiplexing circuit and method for providing end-to-end data management over a single frame-relay virtual circuit of the network.

The circuit includes: (1) a logical channel creation circuit for designating a channel flag and first and second headers to be associated with frames relayed via first and second logical channels over the single frame-relay virtual circuit, respectively and (2) a multiplexer for associating frames of first and second data streams with the first and second logical channels, respectively, by inserting the channel flag and second header into each frame of the second data stream and the first header into only frames of the first data stream for which the associated flags match the channel flag, the first and second logical channels thereby allowed to be multiplexed over the single frame-relay virtual circuit, ones of the frames of the first data stream free of the first header to reduce an overhead of the multiplexing circuit. In a manner to be described more fully, judicious choice of the channel flag allows the first data stream to be relatively free of additional overhead. The second data stream bears the bulk of the additional overhead.

In a preferred embodiment of the present invention, the multiplexing circuit is adapted to operate in a virtual secondary channel mode wherein the logical channel creation circuit designates the first and second logical channels as primary and secondary channels, respectively, the first data stream subject to a more stringent performance requirement than the second data stream. In the virtual secondary channel mode, the multiplexing circuit allows the single frame-relay virtual circuit to relay the secondary channel. The primary channel may be employed, for instance, to carry user traffic, while the secondary channel may be employed, for instance, to carry management traffic.

In a preferred embodiment of the present invention, the multiplexing circuit is adapted to operate in a virtual circuit multiplexing mode wherein the logical channel creation circuit designates the first and second logical channels as native primary and primary channels, respectively, the first data stream subject to a more stringent performance requirement than the second data stream. In the virtual circuit multiplexing mode, the multiplexing circuit allows the single frame-relay virtual circuit to act as multiple frame-relay circuits. The native primary and primary channels may be employed, for example each to carry user traffic.

In a preferred embodiment of the present invention, the logical channel creation circuit designates a second channel flag, associated with the second logical channel, and a third header, the logical channel creation circuit further designating the first and second logical channels and a third logical channel as native primary, primary and secondary channels, respectively, the multiplexing circuit thereby allowing the single frame-relay virtual circuit to act as multiple frame-relay circuits, one of the multiple frame-relay circuits able to relay the secondary channel. The native primary and primary channels may be employed, for example each to carry user traffic, while corresponding secondary channels may be employed to carry, for instance, associated management traffic.

In a preferred embodiment of the present invention, the channel flag and the first and second headers are each a single octet in length. Alternatively, the channel flag and headers can be of a different length, as appropriate.

In a preferred embodiment of the present invention, the multiplexing circuit is embodied within a frame-relay data service unit ("DSU"). The DSU is thereby equipped to service multiple data terminal equipment ("DTE") over the single frame-relay virtual circuit.

In a related, preferred embodiment of the present invention, the DSU is coupled to the network and the network is coupled to a plurality of others of the DSUs, the DSUs cooperable over the network to enable single frame-relay virtual circuits of the network selectively: (1) to act each as multiple frame-relay circuits and (2) to relay the secondary channel. Thus, the circuit, as perhaps embodied in a DSU, is a part of a larger telecommunications network having perhaps millions of multiplex circuit-equipped DSUs capable of employing the frame-relay virtual circuits of the network to advantage.

In a preferred embodiment of the present invention, the first and second data streams emanate from first and second frame-relay DTE, respectively. The present invention is preferably transparent to the DTE. As far as each DTE is concerned, it is coupled to a single, dedicated frame-relay virtual circuit.

In a preferred embodiment of the present invention, the multiplexer inserts the first and second headers into user data fields of the frames. The remainder of the user data fields is employed to carry user data (perhaps user or management traffic, as appropriate).

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 5 illustrates a data frame suitable for transmission over the packet-switching network of FIG. 1 or FIG. 2, including a field for an embodiment of the present invention.

DETAILED DESCRIPTION

Figure 1:
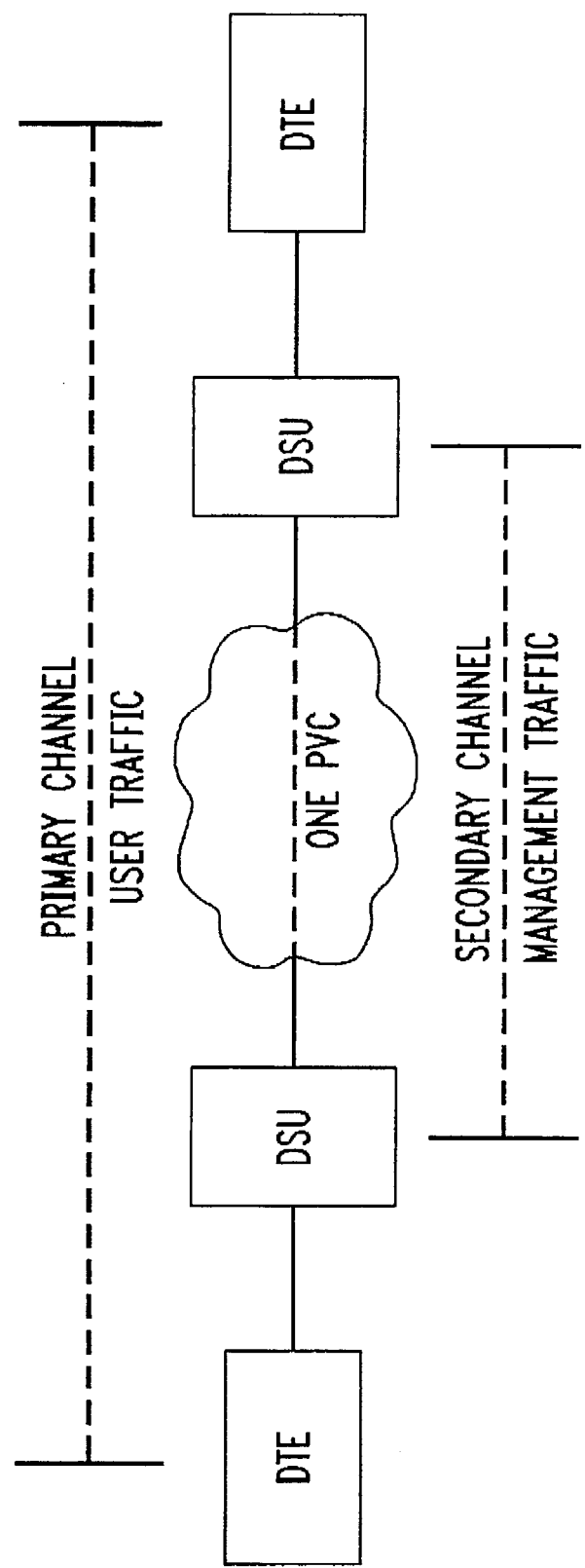
FIG. 1 illustrates a system diagram of a frame-relay or packet-switching network employing an embodiment according to the principles of the present invention.

Referring initially to FIG. 1, illustrated is a system diagram of a frame-relay or packet-switching network 100 employing an embodiment according to the principles of the present invention. The network 100 comprises a first DTE 110 coupled to a first DSU 120 communicating across a single frame-relay virtual circuit 140 with a second DSU 180 coupled to a second DTE 190. While the network 100 is illustrated with only a pair of DSUs 120, 180, the network 100 may be a part of a larger telecommunications network having perhaps millions of multiplex circuit-equipped DSUs capable of employing the frame-relay virtual circuit 140 of the network 100 to advantage. Also, while the first and second DSUs 120, 180 are illustrated servicing the first and second DTEs, 110, 190, respectively, the first and second DSUs 120, 180 are equipped to service multiple DTEs. The single frame-relay virtual circuit 140 includes a primary channel 150 and a plurality of secondary channels 160. The present invention provides a multiplexing circuit and method for providing end-to-end data management of the primary and secondary channels 150, 160, respectively, over the single frame-relay virtual circuit 140.

In the illustrated embodiment, the first and second DSUs 120, 180 contain first and second multiplexing circuits 123, 183, respectively. The multiplexing circuits 123, 183 include logical channel creation circuits 126, 186, respectively, for designating a channel flag and first and second headers to be associated with frames relayed via the primary and secondary channels 150, 160. This mode of operation is referred to as a virtual secondary channel mode due to the fact that the logical channel creation circuits 126, 186 designate the logical channels (i.e. first and second logical channels) as primary and secondary channels 150, 160, respectively.

The multiplexing circuits 123, 183 also include multiplexers 129, 189, respectively, for associating frames of first and second data streams with the primary and secondary channels, 150, 160, respectively. In the illustrated embodiment, the first and second data streams emanate from the first and second DTEs 110, 190, respectively. The present invention, however, is preferably transparent to the DTEs 110, 190. The multiplexers 129, 189 insert the second header into each frame of the second data stream associated with the secondary channel 160 and the first header into only frames of the first data stream associated with the primary channel 150 for which the associated flags match the channel flag. The primary and secondary channels 150, 160 are multiplexed over the single frame-relay virtual circuit 140 with ones of the frames of the first data stream free of the first header to reduce an overhead of the multiplexing circuits 120, 180. As a result of a judicious choice of the channel flag, the first data stream is relatively free of additional overhead, while the second data stream bears the bulk of the additional overhead.

"Overhead," for purposes of the present invention, is defined as additional first virtual channel overhead incurred by virtue of bits added to multiplex according to the present invention. The major factors that influence overhead are: (1) the selected channel flag value and (2) the nature of use of the first octet in the data streams of a frame. Communication protocols commonly place protocol headers in the first several octets of a frame, with the first octet often containing a predictable value. IETF RFC 1490, for example, specifies the first octet of every frame as the control field that may only contain one of three possible values: 0x03, 0xaf or 0xbf. With any flag value outside of these three possibilities, zero overhead is guaranteed.

In most cases, given a well-selected channel flag value, the overhead imposed by this method is expected to be at or near zero.

Table I shows the overhead imposed by this method at various rates of flag occurrence.

TABLE I

| | Primary Channel Overhead | | | | | |
|---|---|---|---|---|---|---|
| Frame Size (bytes) | Frequency of flag value occurring in first octet of Primary Channel frames. | | | | | |
| | 0% | 10% | 20% | 30% | 50% | 100% |
| 64 | 0% | 0.16% | 0.31% | 0.47% | 0.78% | 1.56% |
| 128 | 0% | 0.08% | 0.16% | 0.23% | 0.39% | 0.78% |
| 256 | 0% | 0.04% | 0.08% | 0.12% | 0.20% | 0.39% |

Table II shows the overhead imposed by a similar solution using IETF RFC 1490 encapsulated, with two different encapsulation methods.

The first encapsulation method uses a Network Level Protocol Identification ("NLPID") of 0xcc, indicating an implementation of an Internet Protocol ("IP"), for a header size of two octets. It is assumed that one additional octet is required for equivalent discrimination capabilities for a total overhead of three octets.

The second method uses an NLPID of 0x80, indicating an implementation of a Subnetwork Access Protocol ("SNAP"), for a header size of eight octets.

TABLE II

| | IETF RFC 1490 Overhead | |
|---|---|---|
| Frame Size (bytes) | IETF RFC 1490 NLPID = IP | IETF RFC 1490 NLPID = SNAP |
| 64 | 4.69% | 13% |
| 128 | 2.34% | 6.25% |
| 256 | 1.17% | 3.12% |

As demonstrated by Tables I and II, the multiplexing circuit and method of the present invention substantially decrease the overhead associated with the primary channel 150 of the single frame-relay virtual circuit 140.

Furthermore, in this mode of operation, the first data stream, associated with the primary channel 150, is subject to a more stringent performance requirement than the second data stream, associated with the secondary channel 160. The multiplexing circuits 129, 189, also, allow the single frame-relay virtual circuit 140 to relay the secondary channel 160.

Finally, the primary channel 150 may be employed, for instance, to carry user traffic, while the secondary channel 160 may be employed, for instance, to carry management traffic.

Figure 2:
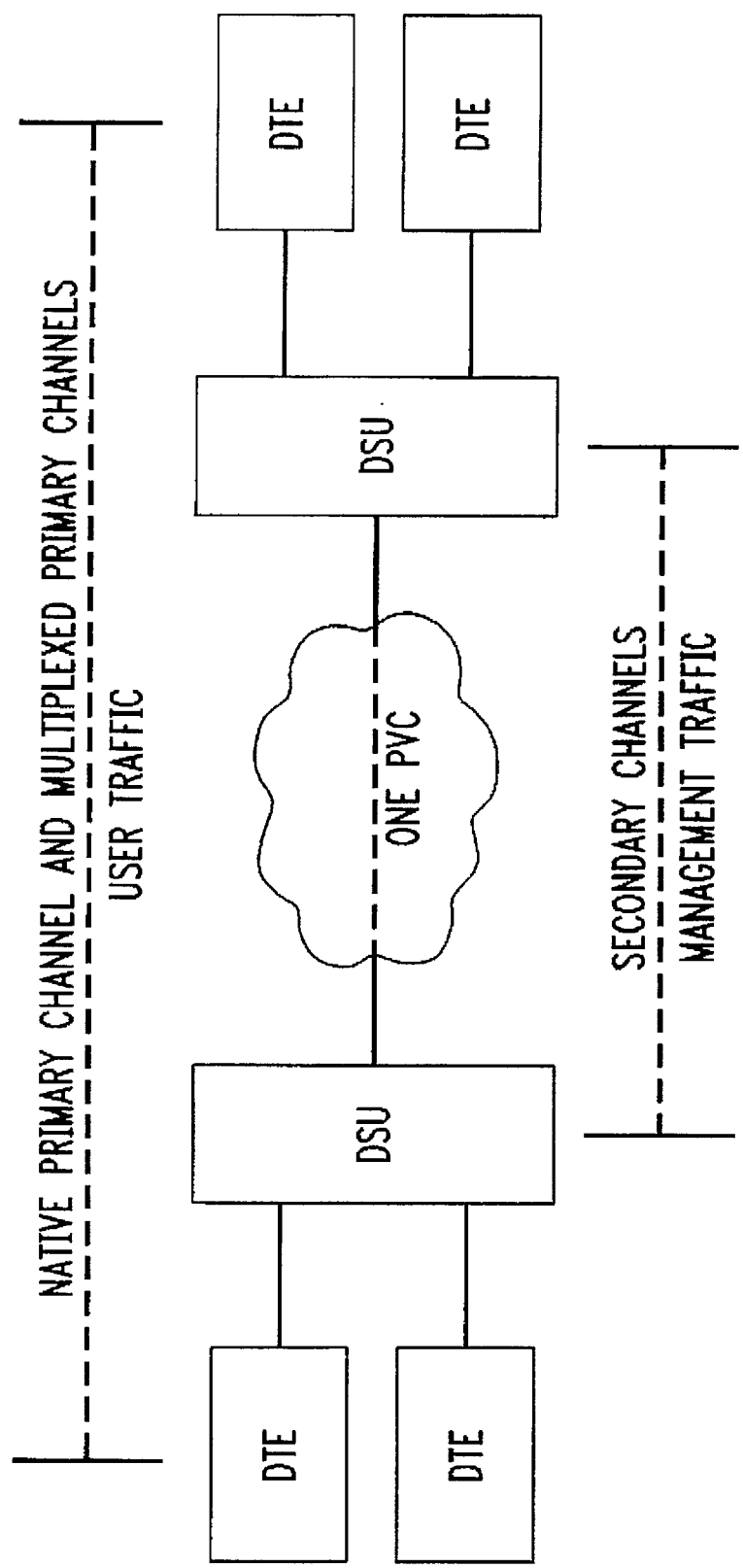
FIG. 2 illustrates a system diagram of an alternative embodiment of a frame-relay or packet-switching network employing an alternative embodiment according to the principles of the present invention.

Turning now to FIG. 2, illustrated is a system diagram of an alternative embodiment of a frame-relay or packet-switching network 200 employing an alternative embodiment according to the principles of the present invention. The network 200 comprises first and second DTEs 210, 220 coupled to a first DSU 230 communicating across a single frame-relay virtual circuit 240 with a second DSU 270 coupled to third and fourth DTEs 280, 290. Again, while the network 200 is illustrated with only a pair of DSUs 230, 270, the network 200 may be a part of a larger telecommunications network having perhaps millions of multiplex circuit-equipped DSUs capable of employing the frame-relay virtual circuit 240 of the network 200 to advantage. Also, while the first and second DSUs 230, 270 are illustrated servicing the first, second and third, fourth DTEs, 210, 220, 280, 290, respectively, the first and second DSUs 230, 270 are equipped to service multiple DTEs. The single frame-relay virtual circuit 240 comprises a native primary channel 250, a plurality of primary channels 255 and a plurality of secondary channels 260. The present invention provides a multiplexing circuit and method for providing end-to-end data management of the native primary, primary and secondary channels 250, 255, 260, respectively, over the single frame-relay virtual circuit 240.

In the illustrated embodiment, the first and second DSUs 230, 270 contain first and second multiplexing circuits 233, 273, respectively. The multiplexing circuits 233, 273 include logical channel creation circuits 236, 276, respectively, for designating a first and second channel flags and first, second and third headers to be associated with frames relayed via the native primary, primary and secondary channels 250, 255, 260 over the single frame-relay virtual circuit 240. This mode of operation is referred to as a virtual circuit multiplexing mode due to the fact that the logical channel creation circuits 236, 276 designate the logical channels (i.e. first, second and third logical channels) as native primary, primary and secondary channels 250, 255, 260, respectively.

The multiplexing circuits 233, 273 also include multiplexers 239, 279, respectively, for associating frames of first, second and third data streams with the native primary, primary and secondary channels, 250, 255, 260, respectively. In this illustrated embodiment, the first, second and third data streams emanate from the first, second, third and fourth DTEs 210, 220, 280, 290. The present invention, however, is preferably transparent to the DTEs 210, 220, 280, 290. The multiplexers 239, 279 insert the second header into each frame of the second data stream associated with the primary channel 255, the third header into each frame of the third data stream associated with the secondary channel 260 and the first header into only frames of the first data stream associated with the native primary channel 250 for which the associated flags match the first channel flag. The native primary and primary channels 250, 255 are multiplexed over the single frame-relay virtual circuit 240 with ones of the frames of the first data stream free of the first header to reduce an overhead of the multiplexing circuits 230, 270. As a result of a judicious choice of the first channel flag, the first data stream is relatively free of additional overhead, while the second and third data streams bear the bulk of the additional overhead. Analogous to the virtual secondary channel mode described with respect to FIG. 1, the multiplexing circuit and method of the present invention substantially decrease the overhead associated with the native primary channel 250 of the single frame-relay virtual circuit 240.

In the virtual circuit multiplexing mode, the first data stream, associated with the native primary channel 250, is subject to a more stringent performance requirement than the second data stream, associated with the primary channel 255. Additionally, the multiplexing circuits 239, 279 allow the single frame-relay virtual circuit 240 to act as multiple frame-relay circuits. The native primary and primary channels 250, 255 may be employed, for example each to carry user traffic, while the secondary channel 260 may be employed, for instance, to carry management traffic. This mode of operation, therefore, provides the ability to multiplex two or more primary channels on a given frame-relay circuit, along with one or more secondary channels.

Figure 3:
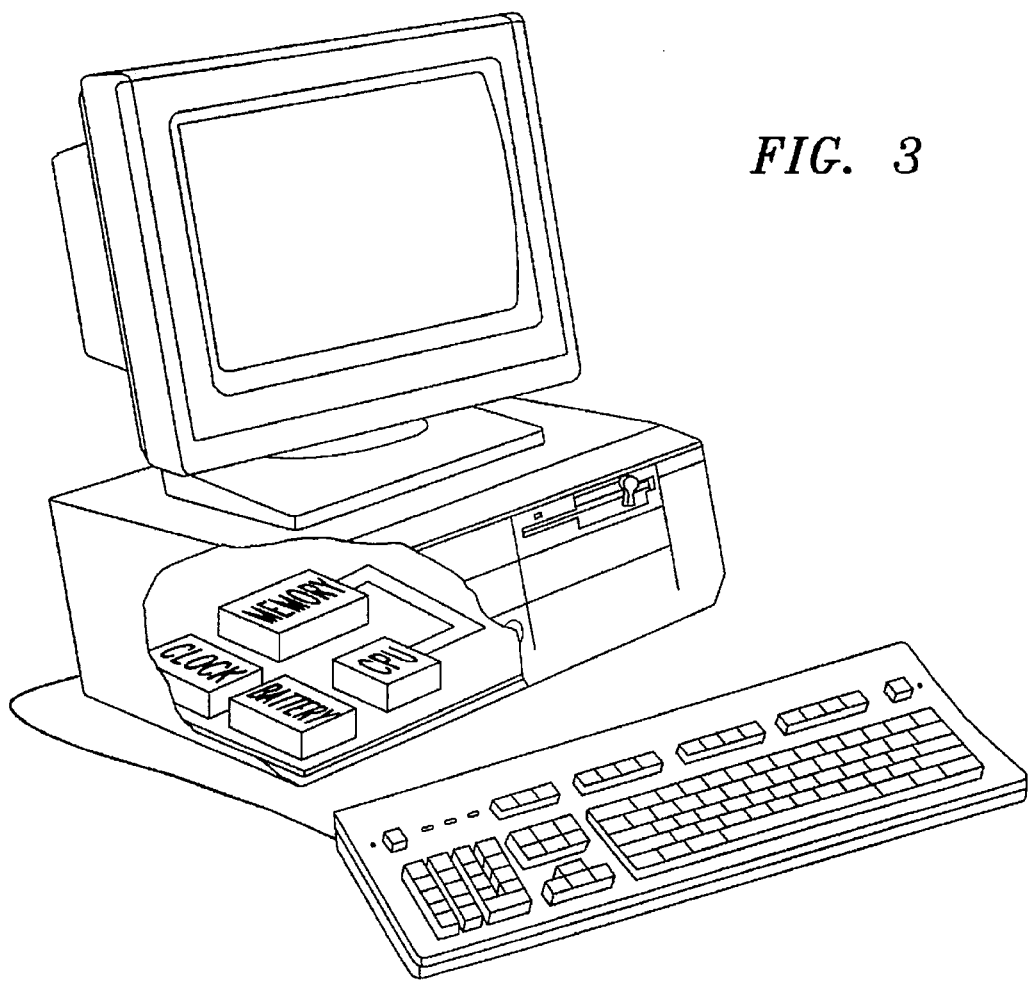
FIG. 3 illustrates an isometric view of a computer system employable as a DSU for the packet-switching networks of FIGS. 1 or 2 providing an environment for operation of the circuit and method of the present invention.

Turning now to FIG. 3, illustrated is an isometric view of a computer system 300 employable as a DSU for the packet-switching networks 100, 200 of FIGS. 1 or 2, respectively, and providing an environment for operation of the circuit and method of the present invention. The computer system 300 may be a conventional personal computer ("PC"), such as an AT&T Globalyst 3356, model no. 1006, available from AT&T GIS, located in Dayton, Ohio, U.S.A., for example.

The computer system 300 includes a monitor 310, chassis 320 and keyboard 330. Alternatively, the monitor 310 and keyboard 330 may be replaced by other conventional output input devices. The chassis 320 includes both a floppy disk drive 340 and a hard disk drive 345. The floppy disk drive 240 is operative to receive, read and write to external disks; the hard disk drive 245 is operative for fast access storage and retrieval. The floppy disk drive 240 may be replaced by or combined with other conventional structures to receive and transmit data and instructions, including without limitation, tape and compact disc drives, telephony systems and devices (e.g. telephone, videophone or facsimile), message paging, network communication ports and the like.

The chassis 320 is illustrated having a cut-away portion that includes a battery 350, clock 360, central processing unit ("CPU") 370 and memory storage device 380. The multiplexing circuitry of the present invention is embodied in the CPU 370 in combination with the memory storage device 380. Although the computer/system 300 is illustrated having a single CPU 370, hard disk drive 345 and memory storage device 380, the computer system 300 may be equipped with a plurality of CPUs and peripheral devices.

It should be noted that any conventional computer system operative in accordance with the principles of the present invention may be used in conjunction with, or replace, the computer system 300, including without limitation, videophones, telephones, televisions, pagers, sophisticated calculators, hand-held, laptop/notebook, mini, mainframe and super computers, as well as processing system network combinations of the same.

Conventional computer and processing system architecture is more fully discussed in *Computer Organization and Architecture*, by William Stallings, MacMillan Publishing Co. (3rd ed. 1993); conventional processing system network design is more fully discussed in *Data Network Design*, by Darren L. Spohn, McGraw-Hill, Inc. (1993); and conventional data communications is more fully discussed in *Data Communications Principles*, by R. D. Gitlin, J. F. Hayes and S. B. Weinstein, Plenum Press (1992) and in *The Irwin Handbook of Telecommunications*, by James Harry Green, Irwin Professional Publishing (2nd ed. 1992). Each of the above-cited publications is incorporated herein by reference.

Figure 4:
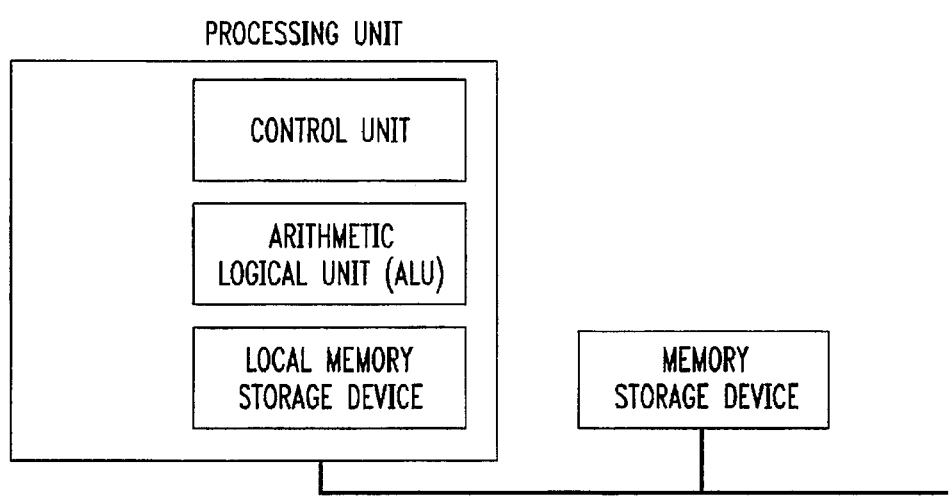
FIG. 4 illustrates a schematic block diagram of the CPU and memory storage device of the computer system of FIG. 3.

Turning now to FIG. 4, illustrated is a schematic block diagram of the CPU 370 and memory storage device 380 of the computer system 300 of FIG. 3. The CPU 370 is coupled to the memory storage device 380 by a data bus 410. The memory storage device 380 stores data and instructions that the CPU 370 uses to execute the functions necessary to operate the computer system 300. The memory storage device 380 may be any conventional memory storage device. The CPU 370 includes a control unit 420, an arithmetic logic unit ("ALU") 430 and a local memory storage device 440 (e.g. stackable cache, a plurality of registers, etc.). The control unit 420 fetches ones of instructions from the memory storage device 380. The ALU 430, in turn, performs a plurality of operations, including addition and Boolean AND, necessary to carry out the instructions fetched from the memory storage device 380. The local memory storage device 440 provides a local high speed storage location for storing temporary results and control information generated and employed by the ALU 430. Again, the multiplexing circuitry of the present invention is embodied in the CPU 370 in combination with the memory storage device 380.

In alternate embodiments, the CPU 370 may suitably be replaced by or combined with programmable logic devices, such as programmable array logic ("PAL") and programmable logic arrays ("PLAs"), digital signal processors ("DSPs"), field programmable gate arrays ("FPGAs"), application specific integrated circuits ("ASICs"), very large scale integrated circuits ("VLSIs") or the like.

Turning now to FIG. 5, illustrated is a data frame 500 suitable for transmission over the packet-switching networks 100, 200 of FIGS. 1 or 2, respectively, including a field for an embodiment of the present invention. While the illustrated data frame 500 is formatted in a Q.922 frame, other frame formats compatible with a frame-relay network are well within the scope of the present invention. The data frame 500 comprises a first flag field 510, an address field 520, a control field 530, a pad field 540, a NLPID field 550, a user information field 560, a frame check sequence ("FCS") field 570 and second flag field 580.

The first and second flag fields 510, 580 signify the beginning and the end of the data frame 500. The address field 520 provides the destination in a frame-relay network (e.g. the first DTE 110 coupled to the first DSU 120 in FIG. 1) for the data frame 500 to travel across a single frame-relay virtual circuit. The control field 530 identifies control information for the Q.922 format. The value of the control field 530 is typically 0x03 for a Q.922 frame unless negotiated otherwise. The pad field 540 is used to align the remainder of the frame to a two octet boundary. There may be zero or one pad octet within the pad field 540 and, if present, must have a value of zero. The NLPID field 550 is administered by the International Standards Organization ("ISO") and the Consultative Committee International Telegraph & Telephone ("CCITT"). It contains values for many different protocols including, for instance, the Internet Protocol ("IP") and the Institute of Electrical and Electronics Engineers Subnetwork Access Protocol ("IEEE SNAP"). The NLPID field 550 relates to the receiver the protocol that is being used by the data frame 500.

A data portion 569 of the user information field 560 carries the substantive data (i.e. the first, second or third data streams) between destinations in the frame-relay network. Additionally, a first and second octet 563, 566, of the user information field 560 carries the first or second channel flags and the first, second or third headers, when necessary, generated by the logical channel creation circuit of the present invention. Finally, the FCS field 570 assures the data integrity of the data frame 500.

There is no single implemented frame size for the data frame 500 in a frame-relay network. Generally, the maximum will be greater than or equal to 1600 octets, but each frame-relay provider will specify an appropriate value for its network. A DTE in a frame-relay network, therefore, must allow the maximum acceptable frame size to be configurable. Conversely, the minimum frame size allowed for the data frame 500 in a frame-relay network is five octets between the first and second flag fields 510, 580 assuming a two octet address field 520. This minimum increases to six octets for a three octet address field 520 and seven octets for a four octet address field 520.

Figure 6:
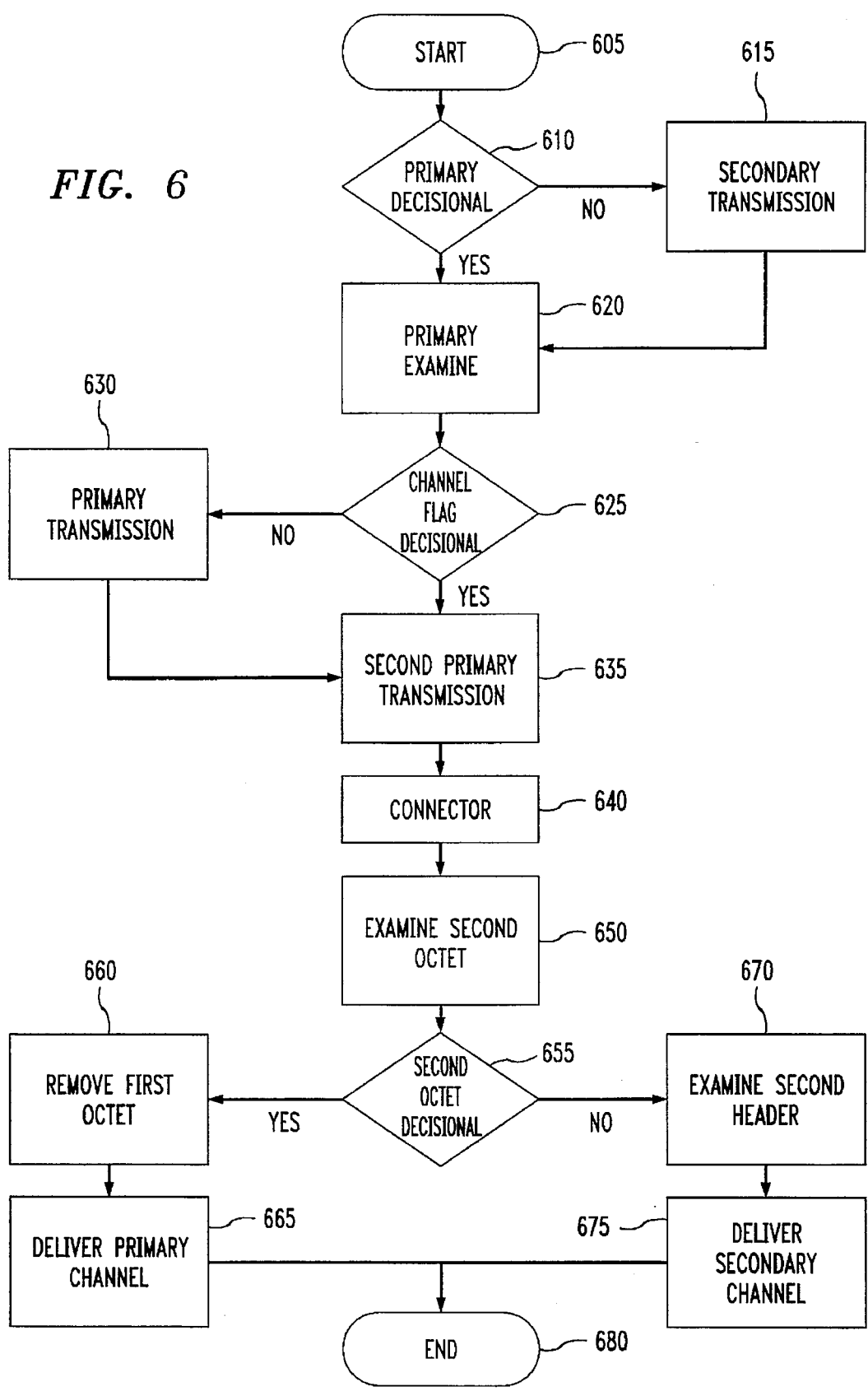
FIG. 6 illustrates a flow diagram of the method of the present invention.

Turning now to FIG. 6, illustrated is a flow diagram of a method of the present invention according to the embodiment of FIG. 1. Again, FIG. 1 illustrates the virtual secondary channel mode whereby the logical channel creation circuits 126, 186 designate the logical channels as primary and secondary channels 150, 160, respectively. With continuing reference to FIGS. 1 and 5, the virtual secondary channel mode of operation will now be explained in greater detail.

The virtual secondary channel mode of operation commences at a start step 605. In a primary decisional step 610, it is determined if the user information 560 emanates from the primary or secondary channel 150, 160. If the data frame 500 is a secondary frame, then the method proceeds to a secondary transmission step 615, otherwise the method proceeds to a primary examine step 620. At the secondary transmission step 615, both the channel flag and the second header are appended to the second data stream in the user information field 560 and the data frame 500 is transmitted on the secondary channel 160 from the first DSU 120 to the second DSU 180 across the single frame-relay virtual circuit 140.

At the primary examine step 620, the first octet in the user information field 560 of every primary frame is examined prior to transmission. At a first channel flag decisional step 625, it is determined if the first octet is equal to the channel flag, generated by the logical channel creation circuit of the present invention. If the first octet is not equal to the channel flag, the primary frame is transmitted over the primary channel 150 without modification in a primary transmission step 630. If the first header is equal to the channel flag, one additional octet containing the channel flag is appended to the user information field 560 of the data frame 500 prior to transmitting the primary frame over the primary channel 150 in a second primary transmission step 635. A connector 640 illustrates a transition between the transmission and reception side of the frame-relay network 100.

Upon frame receipt, the first octet of the data frame 500 is equal to the channel flag and the second octet is thereafter examined in an examine second octet step 650. At a second octet decisional step 655, it is determined if the second octet is equal to the channel flag. If the second octet is equal to the channel flag, the first octet is removed, at a remove first octet step 660. Then, the data frame 500 is delivered on the primary channel 150, at a deliver on primary channel step 665 and the method ends at an end step 680. If the second octet is not equal to flag, the second header is examined, at an examine second header step 670. Then, the data frame 500 is delivered at the secondary channel 160, at a deliver secondary channel step 675 and the method ends at the end step 680.

The virtual circuit multiplexing mode, demonstrated with respect to FIG. 2, functions in a manner similar to the virtual secondary channel mode. The virtual circuit multiplexing mode extends the use of the channel flag/header to one or more multiplexed primary channel frames. The channel flag is used to discriminate native primary channel frames. The headers are used to discriminate among multiplexed primary channels and secondary channels.

Although the present invention has been described in detail, those skilled in the art should understand that they can make various changes, substitutions and alterations herein without departing from the spirit and scope of the invention in its broadest form.

What is claimed is:

1. For use with a frame-relay network capable of relaying frames having associated flags, a multiplexing circuit for providing end-to-end data management over a single frame-relay virtual circuit of said network, comprising:

a logical channel creation circuit for designating a channel flag and first and second headers to be associated with frames relayed via first and second logical channels over said single frame-relay virtual circuit, respectively; and a multiplexer for associating frames of first and second data streams with said first and second logical channels, respectively, by inserting said channel flag and said second header into each frame of said second data stream and said first header into only frames of said first data stream for which said associated flags match said channel flag, said first and second logical channels thereby allowed to be multiplexed over said single frame-relay virtual circuit, ones of said frames of said first data stream free of said first header to reduce an overhead of said multiplexing circuit.

2. The circuit as recited in claim 1 wherein said multiplexing circuit is adapted to operate in a virtual secondary channel mode wherein said logical channel creation circuit designates said first and second logical channels as primary and secondary channels, respectively, said first data stream subject to a more stringent performance requirement than said second data stream, said multiplexing circuit thereby allowing said single frame-relay virtual circuit to relay said secondary channel.

3. The circuit as recited in claim 1 wherein said multiplexing circuit is adapted to operate in a virtual circuit multiplexing mode wherein said logical channel creation circuit designates said first and second logical channels as native primary and primary channels, respectively, said first data stream subject to a more stringent performance requirement than said second data stream, said multiplexing circuit thereby allowing said single frame-relay virtual circuit to act as multiple frame-relay circuits.

4. The circuit as recited in claim 3 wherein said logical channel creation circuit designates a second channel flag, associated with said second logical channel, and a third header for a third data stream, associated with a third logical channel, said logical channel creation circuit further designating said first, second and third logical channels as native primary, primary and secondary channels, respectively, said multiplexing circuit thereby allowing said single frame-relay virtual circuit to act as multiple frame-relay circuits, one of said multiple frame-relay circuits able to relay said secondary channel.

5. The circuit as recited in claim 1 wherein said channel flag and first and second headers are each a single octet in length.

6. The circuit as recited in claim 1 wherein said multiplexing circuit is embodied within a frame-relay data service unit (DSU).

7. The circuit as recited in claim 1 wherein said first and second data streams emanate from first and second frame-relay data terminal equipment (DTE), respectively.

8. The circuit as recited in claim 1 wherein said multiplexer inserts said first and second headers into user data fields of said frames.

9. For use with a frame-relay network capable of relaying frames having associated flags, a multiplexing method for providing end-to-end data management over a single frame-relay virtual circuit of said network, comprising the steps of:

designating a channel flag and first and second headers to be associated with frames relayed via first and second logical channels over said single frame-relay virtual circuit, respectively; and associating frames of first and second data streams with said first and second logical channels, respectively, by inserting said channel flag and said second header into each frame of said second data stream and said first header into only frames of said first data stream for which said associated flags match said channel flag, said first and second logical channels thereby allowed to be multiplexed over said single frame-relay virtual circuit, ones of said frames of said first data stream free of said first header to reduce an overhead of said multiplexing method.

10. The method as recited in claim 9 further comprising the step of designating said first and second logical channels as primary and secondary channels, respectively, said first data stream subject to a more stringent performance requirement than said second data stream, said method thereby allowing said single frame-relay virtual circuit to relay said secondary channel.

11. The method as recited in claim 9 further comprising the step of designating said first and second logical channels as native primary and primary channels, respectively, said first data stream subject to a more stringent performance requirement than said second data stream, said method thereby allowing said single frame-relay virtual circuit to act as multiple frame-relay circuits.

12. The method as recited in claim 11 further comprising the steps of:

designating a second channel flag, associated with said second logical channel, and a third header for a third data stream, associated with a third logical channel; and further designating said first, second and third logical channels as native primary, primary and secondary channels, respectively, said method thereby allowing said single frame-relay virtual circuit to act as multiple frame-relay circuits, one of said multiple frame-relay circuits able to relay said secondary channel.

13. The method as recited in claim 9 wherein said channel flag and first and second headers are each a single octet in length.

14. The method as recited in claim 9 further comprising the step of embodying said multiplexing circuit within a frame-relay data service unit (DSU).

15. The method as recited in claim 9 further comprising the step of receiving said first and second data streams from first and second frame-relay data terminal equipment (DTE), respectively.

16. The method as recited in claim 9 wherein said step of associating comprises the step of inserting said first and second headers into user data fields of said frames.

17. For use with a frame-relay network capable of relaying frame having associated flags, a data service unit (DSU) for providing end-to-end data management over a single frame-relay virtual circuit of said network, comprising:

general purpose data processing and storage circuitry for receiving and transmitting data streams between data terminal equipment (DTE) and said network;

a computer program for allowing said general purpose data processing and storage circuitry to form:

a logical channel creation circuit for designating a channel flag and first and second headers to be associated with frames relayed via first and second logical channels over said single frame-relay virtual circuit, respectively; and a multiplexer for associating frames of first and second data streams received by said DSU with said first and second logical channels, respectively, by inserting said channel flag and said second header into each frame of said second data stream and said first header into only frames of said first data stream for which said associated flags match said channel flag, said first and second logical channels thereby allowed to be multiplexed over said single frame-relay virtual circuit, ones of said frames of said first data stream free of said first header to reduce an overhead of said multiplexing circuit.

18. The DSU as recited in claim 17 wherein said multiplexing circuit is adapted to operate in a virtual secondary channel mode wherein said logical channel creation circuit designates said first and second logical channels as primary and secondary channels, respectively, said first data stream subject to a more stringent performance requirement than said second data stream, said multiplexing circuit thereby allowing said single frame-relay virtual circuit to relay said secondary channel.

19. The DSU as recited in claim 17 wherein said multiplexing circuit is adapted to operate in a virtual circuit multiplexing mode wherein said logical channel creation circuit designates said first and second logical channels as native primary and primary channels, respectively, said first data stream subject to a more stringent performance requirement than said second data stream, said multiplexing circuit thereby allowing said single frame-relay virtual circuit to act as multiple frame-relay circuits.

20. The DSU as recited in claim 19 wherein said logical channel creation circuit designates a second channel flag, associated with said second logical channel, and a third header for a third data stream, associated with a third logical channel, said logical channel creation circuit further designating said first, second and third logical channels as native primary, primary and secondary channels, respectively, said multiplexing circuit thereby allowing said single frame-relay virtual circuit to act as multiple frame-relay circuits, one of said multiple frame-relay circuits able to relay said secondary channel.

21. The DSU as recited in claim 17 wherein said DSU is coupled to said network and said network is coupled to a plurality of others of said DSUs, said DSUs cooperable over said network to enable single frame-relay virtual circuits of said network selectively:

to act each as multiple frame-relay circuits, and to relay said secondary channel.

22. The DSU as recited in claim 17 wherein said channel flag and first and second headers are each a single octet in length.

23. The DSU as recited in claim 17 wherein said first and second data streams emanate from first and second frame-relay data terminal equipment (DTE), respectively.

24. The DSU as recited in claim 17 wherein said multiplexer inserts said first and second headers into user data fields of said frames.

* * * * *

UNITED STATES PATENT AND TRADEMARK OFFICE
CERTIFICATE OF CORRECTION

PATENT NO. : 5,654,966
DATED      : August 5, 1997
INVENTOR(S) : Lee H. Lester, Jr. and Richard Allen Mundwiler It is certified that error appears in the above-indentified patent and that said Letters Patent is hereby corrected as shown below:

Column 11, line 62, replace "frame" with -- frames --.

Signed and Sealed this

Thirtieth Day of December, 1997

*Attest:*

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

Page 1 of 7

It is certified that error appears in the above-identified patent and that said Letters Patent is hereby corrected as shown below:

The title page, showing an illustrative figure, should be deleted and substitute therefor the attached title page.

Delete Drawings Sheets 1-5 and substitute therefor the Drawings Sheets, consisting of FIGS. 1-6, as shown on the attached pages.

Signed and Sealed this

Third Day of November, 1998

Attest:

Attesting Officer

BRUCE LEHMAN
Commissioner of Patents and Trademarks

United States Patent [19]
Lester, Jr. et al.

[11] Patent Number: 5,654,966
[45] Date of Patent: Aug. 5, 1997

[54] CIRCUIT AND METHOD FOR MULTIPLEXING A FRAME-RELAY VIRTUAL CIRCUIT AND FRAME-RELAY SYSTEM HAVING MULTIPLEXED VIRTUAL CIRCUITS

[75] Inventors: Lee H. Lester, Jr., St. Petersburg; Richard Allen Mundwiler, Safety Harbor, both of Fla.

[73] Assignee: Paradyne Corporation, Largo, Fla.

[21] Appl. No.: 557,873

[22] Filed: Nov. 14, 1995

[51] Int. Cl.⁶ .................................................. H04Q 3/04
[52] U.S. Cl. ........................ 370/392; 370/410; 370/522
[58] Field of Search .............................. 370/297, 389, 370/392, 397, 409, 410, 420, 474, 522, 524

[56] References Cited

U.S. PATENT DOCUMENTS

| | | | |
|---|---|---|---|
| 5,237,564 | 8/1993 | Lespagnol et al. | 370/60.1 |
| 5,245,614 | 9/1993 | Gutman et al. | 370/118 |
| 5,291,484 | 3/1994 | Tomita et al. | 370/68.1 |
| 5,315,588 | 5/1994 | Kajiwara et al. | 370/60.1 |
| 5,315,591 | 5/1994 | Brent et al. | 370/85.6 |
| 5,353,336 | 10/1994 | Hou et al. | 379/67 |
| 5,371,731 | 12/1994 | Pratt et al. | 370/13 |
| 5,452,306 | 9/1995 | Turudic et al. | 370/524 |
| 5,481,544 | 1/1996 | Baldwin et al. | 370/392 |
| 5,490,141 | 2/1996 | Lai et al. | 370/397 |
| 5,550,827 | 8/1996 | Fernström | 370/392 |

*Primary Examiner*—Benedict V. Safourek
*Attorney, Agent, or Firm*—Thomas, Kayden, Horstemeyer & Risley

[57] ABSTRACT

For use with a frame-relay network capable of relaying frames having associated flags, a multiplexing circuit and method for providing end-to-end data management over a single frame-relay virtual circuit of the network. The circuit includes: (1) a logical channel creation circuit for designating a channel flag and first and second headers to be associated with frames relayed via first and second logical channels over the single frame-relay virtual circuit, respectively and (2) a multiplexer for associating frames of first and second data streams with the first and second logical channels, respectively, by inserting the channel flag and second header into each frame of the second data stream and the first header into only frames of the first data stream for which the associated flags match the channel flag, the first and second logical channels thereby allowed to be multiplexed over the single frame-relay virtual circuit, ones of the frames of the first data stream free of the first header to reduce an overhead of the multiplexing circuit.

24 Claims, 5 Drawing Sheets

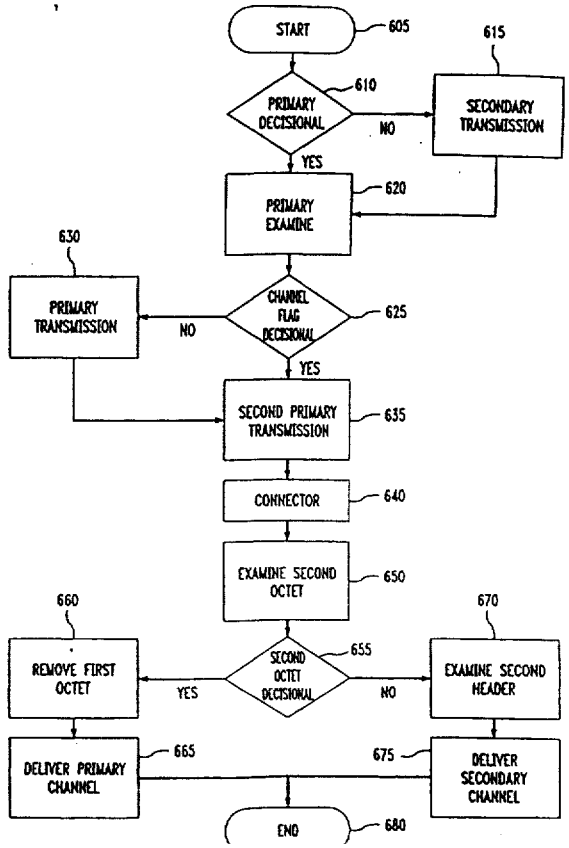

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

Page 3 of 7

It is certified that error appears in the above-identified patent and that said Letters Patent is hereby corrected as shown below:

Replace Fig. 1 with the following:

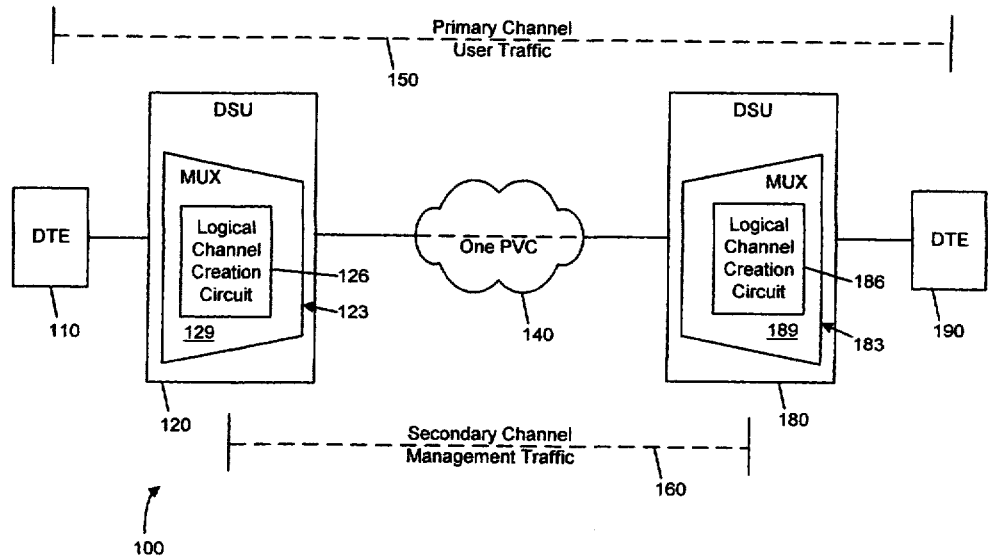

FIG. 1

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

Page 4 of 7

It is certified that error appears in the above-identified patent and that said Letters Patent is hereby corrected as shown below:

Replace Fig. 2 with the following:

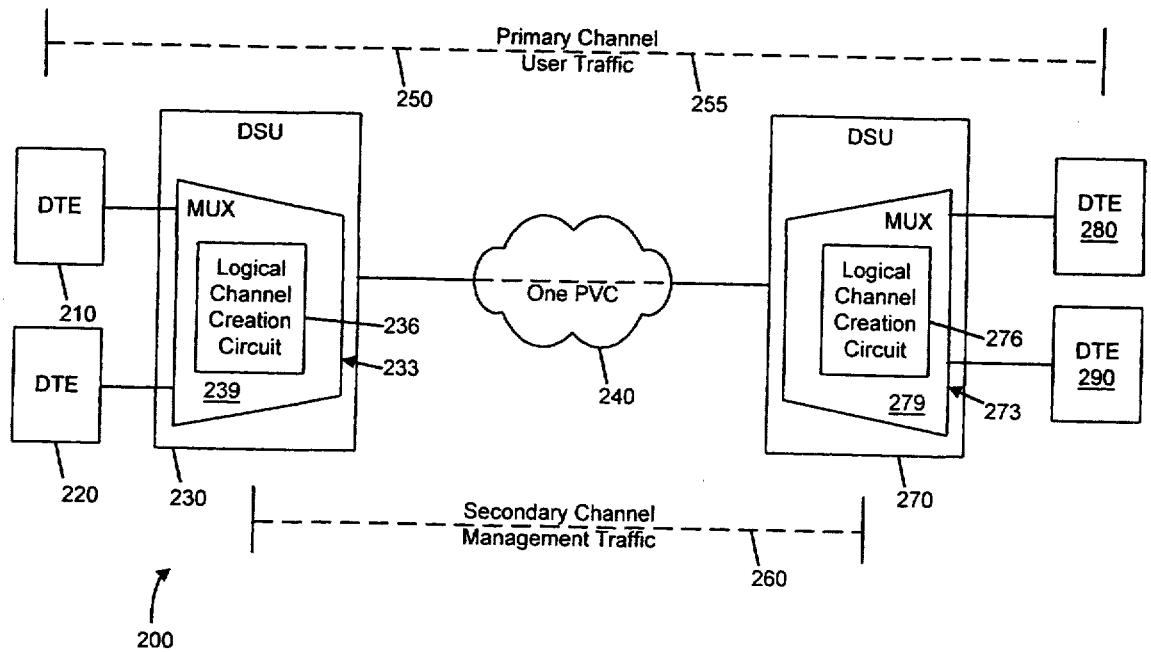

FIG. 2

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

Page 5 of 7

It is certified that error appears in the above-identified patent and that said Letters Patent is hereby corrected as shown below:

Replace Figs. 3 and 4 with the following:

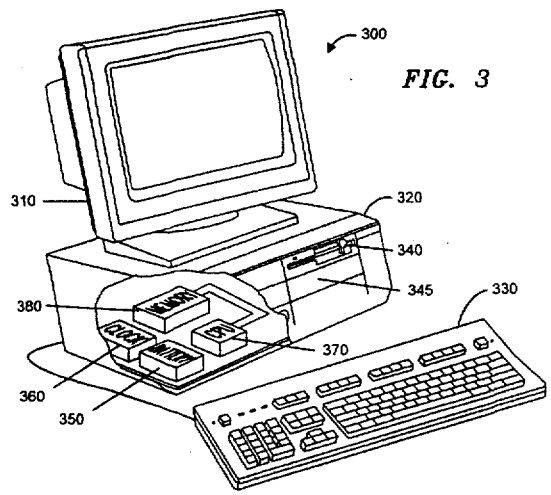

FIG. 3

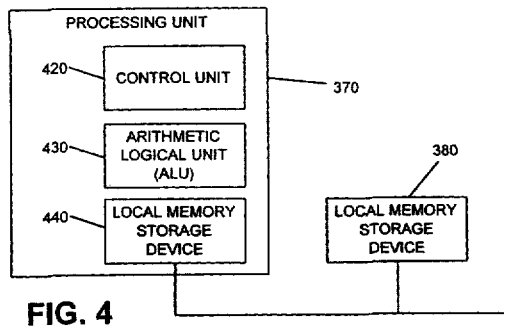

FIG. 4

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

It is certified that error appears in the above-identified patent and that said Letters Patent is hereby corrected as shown below:

Replace Fig. 5 with the following:

FIG. 5

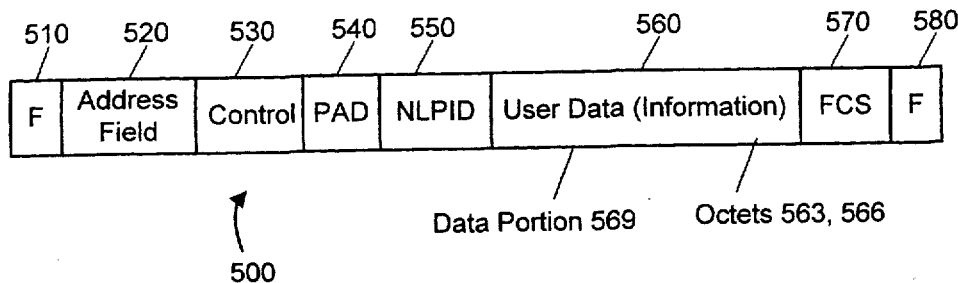

UNITED STATES PATENT AND TRADEMARK OFFICE
CERTIFICATE OF CORRECTION

PATENT NO. : 5,654,966
DATED : August 5, 1997
INVENTOR(S) : LESTER, JR., et al.

It is certified that error appears in the above-identified patent and that said Letters Patent is hereby corrected as shown below:

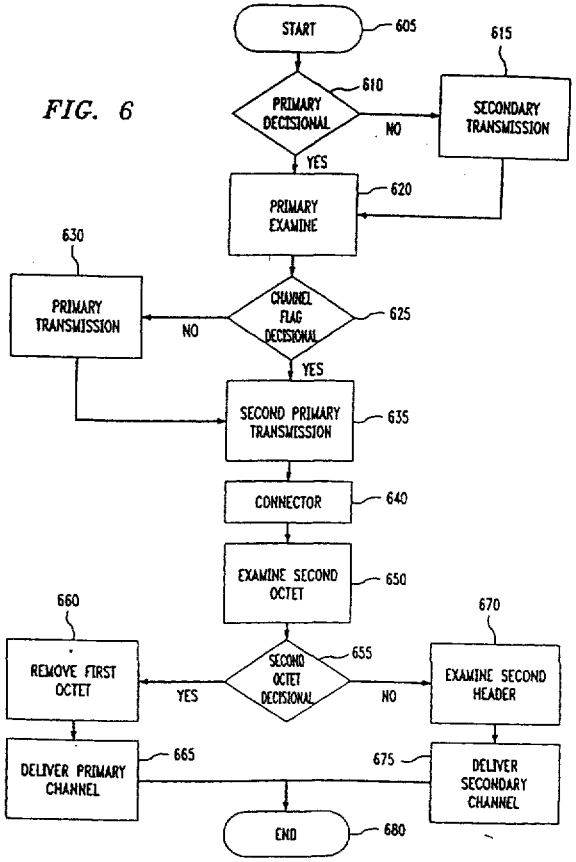

FIG. 6